Oct. 18, 1966     F. M. BOWERS ET AL     3,279,951
WATER ACTIVATED MAGNESIUM ANODE BATTERY AND SEPARATOR THEREFOR
Filed July 19, 1963
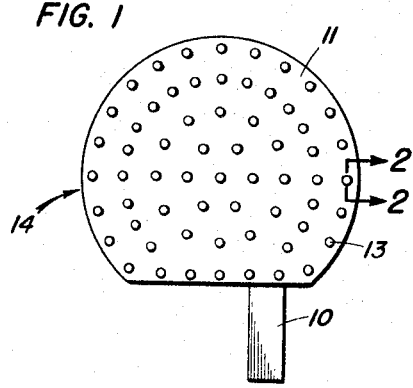
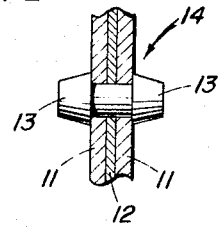
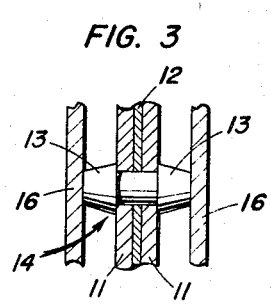
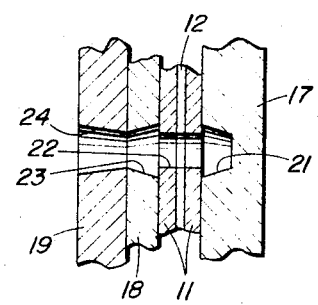
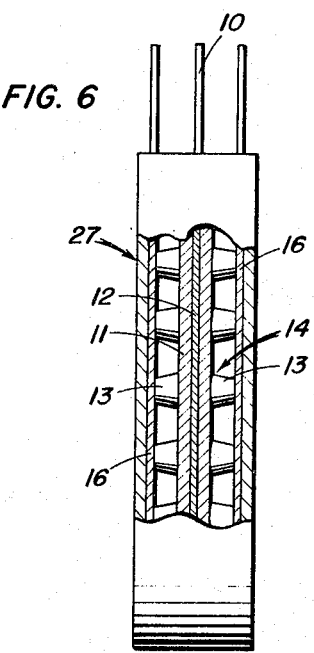
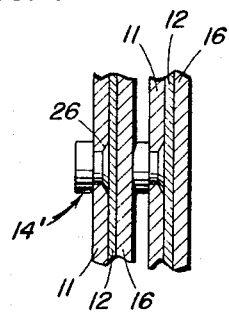
INVENTORS
Frederic M. Bowers
Hyman Kessler
BY
ATTORNEY
AGENT United States Patent Office 3,279,951
Patented Oct. 18, 1966

3,279,951
WATER ACTIVATED MAGNESIUM ANODE BATTERY AND SEPARATOR THEREFOR
Frederic M. Bowers and Hyman Kessler, Silver Spring, Md., assignors to the United States of America as represented by the Secretary of the Navy
Filed July 19, 1963, Ser. No. 296,414
5 Claims. (Cl. 136—100)

The invention described herein may be manufactured and used by or for the Government of the United States of America for governmental purposes without the payment of any royalties thereon or therefor.

The present invention relates to an electric battery and more particularly to a new and improved battery separator wherein the electrodes are rigidly positioned throughout the entire life of the battery.

In the field of electric batteries and particularly battery separators for use in sea water batteries, it has been the practice to separate the anode and cathode by use of glass beads or tiny plastic droplets affixed to the cathode to maintain the proper separation between the electrodes. Although such devices have served the purpose, they have not proved entirely satisfactory under all conditions of service for the reasons that considerable difficulty has been experienced due to the condensation of water vapor on these separators causing corrosion and short circuits when the batteries are in storage.

In storage, water vapor has condensed upon the glass beads and the plastic droplets utilized as separators and has acted as an electrolyte between the anode and the cathode thereby causing electrolytic action and corrosion which eventually loosens the battery separators.

Glass beads or plastic droplets mounted upon the surface of the cathode, which is generally silver chloride, frequently become dislodged in use. Since the magnesium anode is dissolved by the electrolytic action of the battery when supplying electrical power, the increased spacing between the electrodes allows the separators to become loose so that the various elements are free to make internal short circuits within the battery.

The purpose of this invention is to provide a separator and a method of making the separator in which a hydrophobic material, in the liquid state, is forced through a perforation in one of the electrodes and by use of a mold, heads are formed to securely lock the separator to the anode. A hydrophobic material is a material of the class upon which moisture from the air under normal conditions will not condense. In the case where the separator passes through two or more elements of the battery the separator performs the additional function of maintaining both mechanical support for the elements as well as electrical contact.

An object of the present invention is to provide an insulated separator for an electrical battery which maintains proper alignment of the electrodes throughout the entire useful life of the battery.

A further object of the present invention is to provide an insulated separator for use in a sea water battery which is resistant to the condensation of moisture on the insulator.

Another object is to provide a separator in an electrical battery which mechanically clamps a plurality of electrodes together to form a portion of the electrical circuit.

Yet another object of the present invention is to provide a method of forming a separator which is integral with at least one electrode in an electrical battery.

Other objects, advantages and novel features of the invention will become apparent from the following detailed description of the invention when considered in conjunction with the accompanying drawing wherein:

FIG. 1 is a view of a surface of an electrode illustrating a plurality of insulated separators protruding therefrom;

FIG. 2 is an enlarged sectional view of the insulated separator structure and electrodes taken along the lines 2—2 of FIG. 1;

FIG. 3 illustrates a portion of a sea water battery in which the separator maintains electrical contact between a plurality of anodes while at the same time maintaining the necessary separation of the anodes from the cathodes;

FIG. 4 illustrates the mold structure with the electrodes positioned therein for forming the separators;

FIG. 5 illustrates a modification of the separator of FIG. 2 as used in a pile or duplex type battery; and FIG. 6 illustrates a typical two cell sea water battery with a portion of the case shown in section to illustrate the position of the electrodes.

Referring now to the drawings, wherein like reference characters designate like or corresponding parts throughout the several views, there is shown in FIG. 1 a substantially circular magnesium anode 11 with a portion of a silver foil tab 10 extending from a truncated portion of the magnesium anode. Protruding from the surface of the magnesium anode 11 are a plurality of heads 13 of electrical separators.

Referring to FIG. 2 there is shown a pair of magnesium anodes 11 with the silver foil 12 interposed between the pair of magnesium anodes. One surface of each of the magnesium anodes is an electrical contact with a different surface of the silver foil 12. The electrical contact between the anodes and the silver foil 12 is maintained by the clamping action of heads 13 of an electrical separator 14 coacting with the other surface of each of the anodes.

In viewing both FIGS. 1 and 2 concurrently, the shape of both magnesium anodes and the silver foil 12 are identical except for the tab of the silver foil 10 shown in FIG. 1. The plurality of separator heads 13 shown on the surface of the magnesium anode 11 of FIG. 1 maintain one surface of each of the magnesium anodes in electrical contact over the entire area with the silver foil 12 which acts to collect and conduct the current from the battery to an external load.

Referring to FIG. 3, a portion of a battery is shown to illustrate the manner in which the separators 13 separate the magnesium anodes 11 from silver chloride cathodes 16.

In a battery having magnesium anodes, silver chloride cathodes and sea water as an electrolyte, the chemical reaction which occurs on the production of electrical power causes the decomposition of the magnesium anodes 11 and the changing of the silver chloride cathode to a silver plate. The size and shape of the silver chloride cathode is not altered by the electrolytic action, but the magnesium anode is decomposed and consumed.

The fact that the separator 14 mechanically supports and maintains the anodes in position results in a longer and more useful life from the battery by the elimination of short circuits. Remembering that the silver chloride cathodes do not change size or shape in the reaction it will be noted that the heads 13 of the electrical separator are in constant contact with the cathodes 16 so that they remain in a fixed position throughout the entire life of the battery. It should be remembered that the shape of the anodes and cathodes of FIG. 3 will be identical to the shape of the anodes shown in FIG. 1.

Referring to FIG. 4 some of the necessary structure for performing the molding operation is illustrated. The molding apparatus is shown with the two anodes 11 and the silver foil 12 interposed between a base mold 17 and a cap mold 18. The cap mold 18 is interposed between one of the anodes 11 and a shear cap 19. The base mold 17 has a recess 21 in the shape of the head of one of the electrical separators. The two anodes 11 and the silver foil 12 have an aperture 22 extending through all of the elements. This aperture is formed either by punching or drilling with the anodes 11 and silver plate 12 joined together so that the aperture is aligned through the various parts. The cap mold 18 has a divergently tapered aperture 23 therethrough in the form of a head upon the separators. The shear cap 19 has a funnel shaped aperture 24 therethrough for directing the liquid hydrophobic material into the mold of the electrical separator.

The first step in the process is to assemble the non-perforated anodes 11 and silver foil 12 in a stack with the silver foil 12 interposed between the two anodes. A plurality of apertures 22 are then punched or drilled through the anodes 11 and silver foil 12. The anodes 11 and silver foil 12 with the apertures 22 are then placed between the base mold 17 and the cap mold 18 with the apertures 22 in alignment with the recesses 21 and the apertures 23. The shear plate 19 is then placed over the cap mold 18 so that the apertures 24 are in alignment with the apertures 23 and the assembly of mold inserts is then positioned within a mold (not shown). The entire assembly of the mold is maintained at approximately 100° F. By conventional means the liquid hydrophobic material is then forced under pressure through the aperture 24 in the shear plate 19 to completely fill the mold inserts and form the electrical separator.

A suitable material for forming the separators is a high density polyethylene, in the range of .941–.965. This material has a very low water absorption rate of .01 percent over a 24-hour period and its heat distortion of 60–82° C. under 66 p.s.i. when conducted by ASTM Test Method D648. The preferred material is a high density ethylene butene-1 copolymer having a density of 0.950, a melt index of 0.3 and an environmental stress cracking in excess of 250 hours under ASTMD1693–59T. Other suitable materials include polystyrene, polycarbonates, acetal resins, acrylic resins, polyamide resins, acrylate-butadiene-styrene polymers, and copolymer resins such as monochloro-trifluorethylene.

The temperature of these materials during molding is maintained at approximately 400° F. with the determining factors being the annealing point of magnesium which is approximately 500° F. and the melting point of the material used. After the material is forced in the liquid state into the mold insert it is allowed to set before the shear cap 19 is rotated, by a suitable tool, to shear the electrical separator off level with the outside surface of the cap mold 18. The product thus formed is best shown in FIGS. 1 and 2 and as has been explained hereinbefore. The molds 17 and 18 together with the shear plate 19 maintain the dimensions of the electrical separator within the necessary close tolerances. The most critical tolerance is the perpendicular distance the head of the separator extends from the surfaces of the magnesium anodes 11. A continuous mold process could be employed by maintaining a large mass of molten plastic as a supply for the mold. In this method the small separators would solidify before the supply of plastic material and the molding process could be a continuous cycle.

Although FIG. 4 illustrates the use of a pair of anodes 11 with a silver foil interposed therebetween this process is adaptable to any combination of anodes and cathodes from a single electrode to a plurality of electrodes.

FIG. 5 illustrates another embodiment of the invention and a modification of the normal duplex or pile type battery. In this particular embodiment the electrical separator 14' is formed in the magnesium anode only. The process for forming the electrical separator 14' is identical to that illustrated in FIG. 4 with the exception that in forming the apertures in the magnesium anode 11 a slight flare 26 is formed substantially uniform and coextensive with one surface of the magnesium anode for the purpose of maintaining the electrical separator 14' rigidly in position in the magnesium anode 11. This aperture could be of a uniform cylindrical construction if the assembly process of the completed battery is performed after the forming of the electrical separator. The principle of operation remains the same since the silver foil 12 and the silver chloride cathodes 16 do not change in shape or form due to the electrolytic action within the battery. Thus, this electrical separator 14' maintains the position of the elements throughout the entire life of the battery.

FIG. 6 illustrates a typical enclosure for a battery of the type shown in FIG. 3. The details of the case 27 enclosing the battery have not been shown since they form no part of this invention and are well known in the art. A portion of the casing has been removed to show the position of the electrodes within the case 27. This figure illustrates in a graphic way the function of the separators 14 in maintaining the position of the anode and cathode throughout the life of the battery. The separators 14 are in contact with the silver chloride cathodes 16 and maintain these rigidly in position against the interior sides of the case 27. When the electrolytic action occurs and the magnesium anodes 11 are dissipated, the separators 14 maintain the position of both the silver chloride cathode and the magnesium anodes so that there is little or no chance of internal shorting of the battery due to a shift or readjustment of the anodes, electrodes or the separators.

In summary, the electrical separator 14 cooperates with the other elements of the battery to maintain the proper separation between the anode and cathode and results in improved operation by the elimination of internal short circuits caused by a shifting of the separators or electrodes within the battery. The use of a hydrophobic material eliminates the internal short circuits caused by moisture condensing on the separators while the batteries are in storage.

Obviously many modifications and variations of the present invention are possible in the light of the above teachings. It is therefore to be understood that within the scope of the appended claims the invention may be practiced otherwise than as specifically described.

What is claimed is:
1. An electric battery comprising:
   first and second thin magnesium anodes having a silver foil conductor in contact with and interposed therebetween with each anode and the foil conductor having a plurality of aligned apertures extending transversely therethrough;
   a hydrophobic material formed as an electrode separator by completely filling each aperture of the anodes and interposed conductor with a quantity of quick-setting fluid hydrophobic material, whereby a tight fitting separator is provided having protrusions extending beyond the outermost surface of each anode;
   first and second thin silver chloride cathodes, one placed adjacent to and in parallel with each of the outermost surfaces of the anode-foil arrangement and in contact with the protrusions of hydrophobic material, whereby electrical energy is produced upon the insertion of a sea water electrolyte, resulting in deterioration of the magnesium anodes which are rigidly maintained by said hydrophobic material separator in their relative positions with respect to said cathodes for the life of the battery
2. Apparatus as recited in claim 1 wherein said hydrophobic material comprises a high density polyethylene plastic.

3. An electric battery as defined in claim 1, wherein said hydrophobic material is a hydrophobic organic plastic.

4. An electric battery as defined in claim 3, wherein said plastic is ethylene-butene-1.

5. An electric battery as set forth in claim 1, wherein said hydrophobic material is provided with an enlarged head at each end thereof projecting beyond said faces and having a diameter greater than the diameter of said aperture.

References Cited by the Examiner

UNITED STATES PATENTS

| | | | |
|---|---|---|---|
| 359,934 | 3/1887 | Main | 136—151 |
| 3,098,762 | 7/1963 | Roblee et al. | 136—86 X |
| 3,148,090 | 9/1964 | Saslow | 136—100 |
| 3,185,592 | 5/1965 | Kirk et al. | 136—100 |

WINSTON A. DOUGLAS, *Primary Examiner.*

B. J. OHLENDORF, *Assistant Examiner.*